(12) United States Patent
Ohtsuka

(10) Patent No.: US 9,036,056 B2
(45) Date of Patent: May 19, 2015

(54) IMAGE COMMUNICATION SYSTEM, TERMINAL DEVICE, MANAGEMENT DEVICE AND COMPUTER-READABLE STORAGE MEDIUM

(75) Inventor: Toshihiko Ohtsuka, Ome (JP)

(73) Assignee: Casio Computer Co., Ltd, Tokyo (JP)

( * ) Notice: Subject to any disclaimer, the term of this patent is extended or adjusted under 35 U.S.C. 154(b) by 130 days.

(21) Appl. No.: 13/609,910

(22) Filed: Sep. 11, 2012

(65) Prior Publication Data

US 2013/0070111 A1 Mar. 21, 2013

(30) Foreign Application Priority Data

Sep. 21, 2011 (JP) .................................. 2011-205558

(51) Int. Cl.
*H04N 5/262* (2006.01)
*H04N 7/00* (2011.01)
*H04N 5/232* (2006.01)

(52) U.S. Cl.
CPC ....... *H04N 5/23206* (2013.01); *H04N 5/23293* (2013.01)

(58) Field of Classification Search
CPC .................................................... H04N 5/2723
USPC .................................................... 348/239, 115
See application file for complete search history.

(56) References Cited

U.S. PATENT DOCUMENTS

| 2008/0253656 | A1* | 10/2008 | Schwartzberg et al. | 382/181 |
|---|---|---|---|---|
| 2009/0102859 | A1* | 4/2009 | Athsani et al. | 345/619 |
| 2010/0103075 | A1* | 4/2010 | Kalaboukis et al. | 345/8 |
| 2011/0096844 | A1* | 4/2011 | Poupel et al. | 375/240.25 |
| 2013/0002717 | A1* | 1/2013 | Deffeyes et al. | 345/633 |
| 2013/0057585 | A1* | 3/2013 | Ahmad Athsani et al. | 345/633 |
| 2013/0194305 | A1* | 8/2013 | Kakuta et al. | 345/633 |
| 2013/0238467 | A1* | 9/2013 | Iwabuchi et al. | 705/26.62 |

FOREIGN PATENT DOCUMENTS

| JP | 2005-332091 | 12/2005 |
|---|---|---|
| JP | 2009-199438 | 9/2009 |

OTHER PUBLICATIONS

Office Action of Notification of Reason(s) for Rejection for Japanese Patent Application No. 2011-205558 Dated Apr. 7, 2015, 8 pages.

* cited by examiner

*Primary Examiner* — Nhan T Tran
*Assistant Examiner* — Chan Nguyen
(74) *Attorney, Agent, or Firm* — Amin, Turocy & Watson, LLP

(57) ABSTRACT

In an image communication system of the present invention, the transmission and reception of images are performed between a mobile phone, which combines a base image (character) with an accessory image and displays the composite image, and a server device via a communication network. When an image of a subject is captured by an imaging section, the mobile phone recognizes the subject in the captured image as an image for distinguishing a character. Subsequently, the server device generates an accessory image based on the recognized distinguishing image. Then, the mobile phone combines the generated accessory image with the base image (character), and displays the composite image.

18 Claims, 14 Drawing Sheets

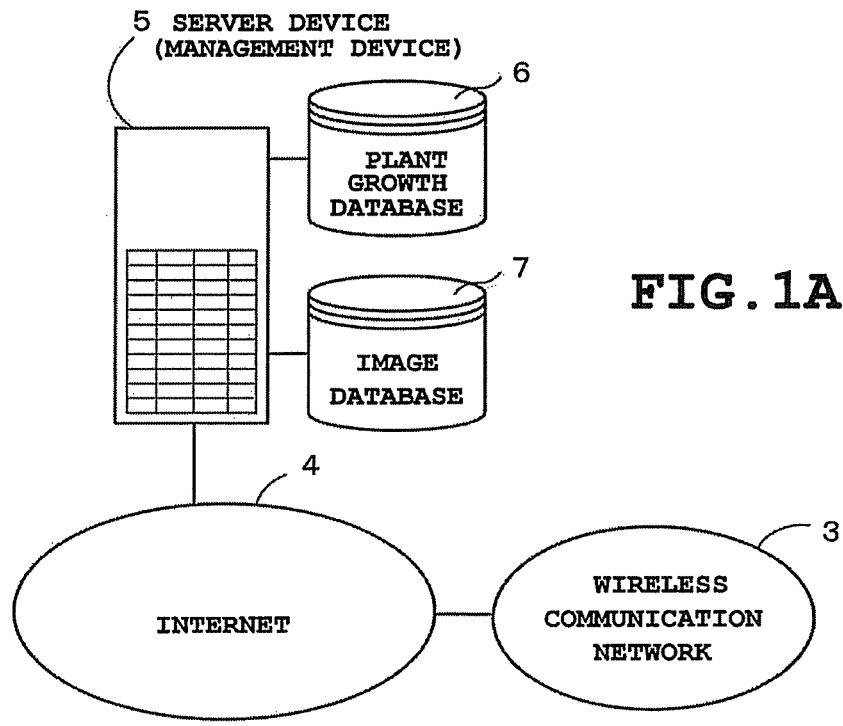
FIG.1A
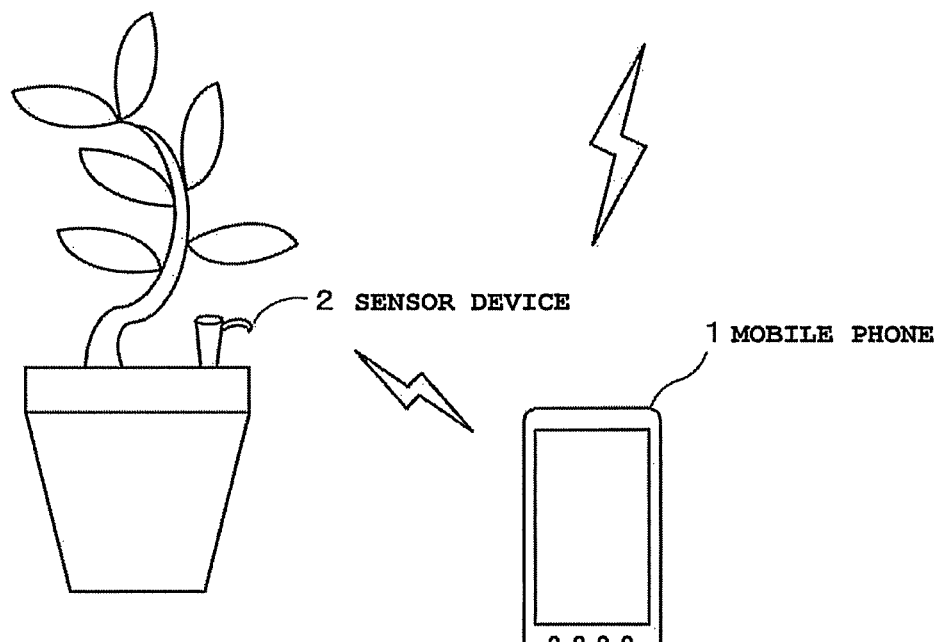
FIG.1C
FIG.1B

FIG. 6
| ID | DISTIN-GUISHING IMAGE | ACCESSORY IMAGE | ACCESSORY SHAPE | REGIS-TRATION DATE | DATE OF USE | STATUS |
|---|---|---|---|---|---|---|
| 1 |  |  | KEY HOLDER | * * * | * * * | True |
| 2 |  |  | KEY HOLDER | * * * | * * * | False |
| 3 |  |  | KEY HOLDER | * * * | * * * | True |
| 4 |  TANAKA | TANAKA | NAME HOLDER | * * * | * * * | True |
| 5 | 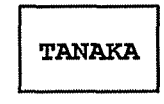 1 | 1 | BADGE (NUMBER TAG) | * * * | * * * | True |
| | ..... | ..... | ..... | ..... | ..... | ..... |
7 IMAGE DATABASE

IMAGE COMMUNICATION SYSTEM, TERMINAL DEVICE, MANAGEMENT DEVICE AND COMPUTER-READABLE STORAGE MEDIUM

CROSS-REFERENCE TO RELATED APPLICATION

This application is based upon and claims the benefit of priority from the prior Japanese Patent Application No. 2011-205558, filed Sep. 21, 2011, the entire contents of which is incorporated herein by reference.

BACKGROUND OF THE INVENTION

1. Field of the Invention

The present invention relates to an image communication system, a terminal device, a management device and a program for transmitting and receiving images between a terminal device that combines an accessory image with a base image and displays the composite image, and a management device that manages images via a communication network.

2. Description of the Related Art

Recently, in cases where people display characters representing themselves on a network, such as when social networking service (SNS) users sharing a common interest communicate over a network using their alter-ego images (avatars), their avatars tend to be similar to each other. This is because they share the same interest and many of the avatars are related to this common interest. In such cases, accessories are added to their avatars. However, they have to select their desired accessories from predetermined accessories, and therefore their accessories tend to be similar to each other as well as their avatars. As a technology for adding an accessory to an avatar, a technology is known in which an accessory selected based on user attributes is added to the avatar (refer to Japanese Patent Application Laid-open (Kokai) Publication No. 2005-332091).

In the above-described technology described in Japanese Patent Application Laid-open (Kokai) Publication No. 2005-332091, the distinctiveness of an avatar can be significantly improved by the automatic generation of an avatar having an accessory. However, for the determination of user attributes, a predetermined test is required to be performed on the user as a preliminary step. Also, in this technology, accessories may become similar among people with similar user attributes.

SUMMARY OF THE INVENTION

An object of the present invention is to generate an accessory image having high distinctiveness when generating an accessory image that is combined and displayed with a base image.

In order to achieve the above-described object, in accordance with one aspect of the present invention, there is provided an image communication system including a terminal device and a management device, comprising: an imaging section which captures an image of a subject in the terminal device; a recognizing section which recognizes the subject in the image captured by the imaging section as a distinguishing image for a base image; a generating section which generates an accessory image based on the distinguishing image; a first combining section which generates a first composite image by combining the accessory image with the base image; and a display section which displays the first composite image on the terminal device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1A is a diagram showing a server device 5 in an image communication system (plant growth management system);

FIG. 1B is a diagram showing a mobile phone 1 in the image communication system (plant growth management system);

FIG. 1C is a diagram showing a sensor device 2 in the image communication system (plant growth management system);

FIG. 6 is a diagram for explaining an image database 7;

DETAILED DESCRIPTION OF THE PREFERRED EMBODIMENTS

Figure 2:
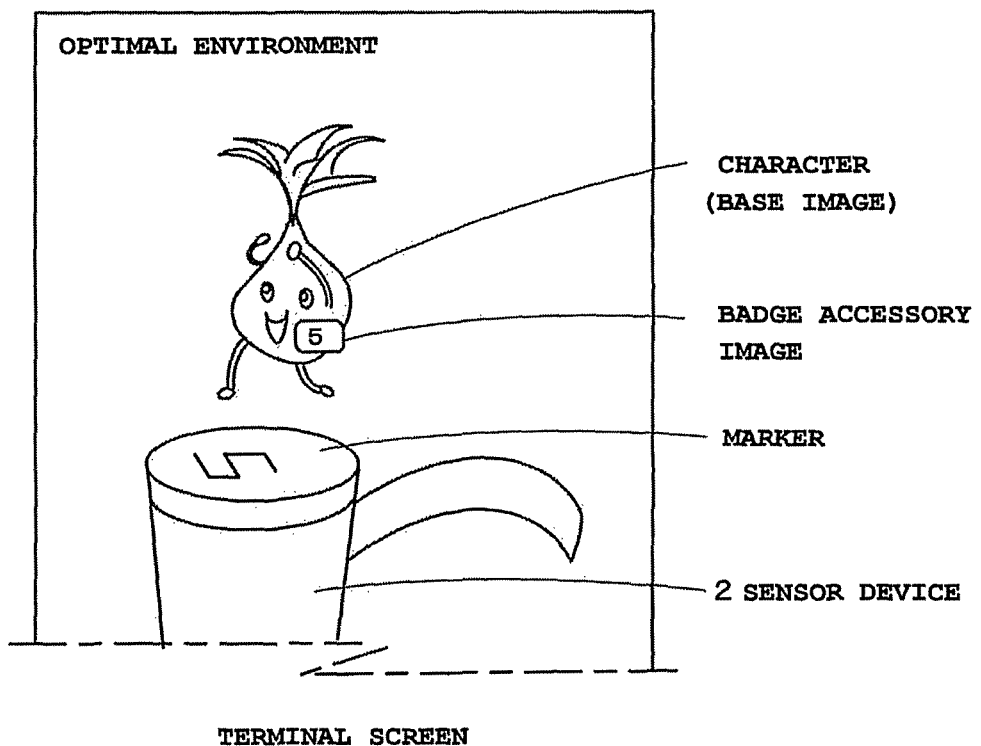
FIG. 2 is a diagram showing a display example when a character has been displayed within an image (through image) captured by the camera function of the mobile phone 1.

The preferred embodiments of the present invention will hereinafter be described with reference to the drawings.

(First Embodiment)

First, a first embodiment of the present invention will be described with reference to FIG. 1A to FIG. 12.

The first embodiment is an example in which the present invention has been applied to a communication system, and FIG. 1A to FIG. 1C are diagrams showing this communication system.

This communication system, which includes a mobile phone 1, a sensor device 2, a wireless communication network 3, the Internet 4, and a server device (management device) 5, is an image communication system (plant growth management system) where an image captured on the mobile phone 1 side is transmitted to the server device (management device) 5 via the wireless communication network 3 and the Internet 4, and an image generated on the server device 5 side is transmitted over the Internet 4 and the wireless communication network 3. Also, in the image communication system (plant growth management system), friends sharing a common interest (plant cultivation) can communicate over a network.

The mobile phone 1 in FIG. 1B has a call function, an electronic mail function, an Internet connection function (web access function), a short-range communication function, an image-capturing function (camera function), etc., and performs short-range communication with the sensor device 2 that detects the growth environment of a plant. When the mobile phone 1 is connected to the wireless communication network 3 via a nearby base station (not shown), phone calls and electronic mail transmissions can be made between the mobile phone 1 and another mobile phone (not shown) over the wireless communication network 3. Also, when the mobile phone 1 is connected to the Internet 4 via the wireless communication network 3, electronic mail transmissions can be made and web pages can be viewed.

The sensor device 2 in FIG. 1C includes an environment sensor (temperature sensor, moisture sensor, etc.) that detects the growth environment of a plant, and is set near a plant (such as within a flower pot). When sensor detection results (current growth environment) are received from the sensor device 2, the mobile phone 1 transmits the type of the plant and the current growth environment to the server device 5 over the wireless communication network 3 and the Internet 4. Then, when the type of the plant and the current growth environment are received from the mobile phone 1, the server device 5 searches a plant growth database 6 based on the received results, and transmits growth information indicating the current growth condition (optimal environment, lack of moisture, excessive sunlight exposure, etc.) based on the type of the plant to the mobile phone 1. The plant growth database 6 described above stores growth information indicating a current growth condition, a growth method, and the like based on the type of plant. In addition to this plant growth database 6, the server device 5 includes an image database 7 described hereafter.

When growth information is received from the server device 5, the mobile phone 1 displays a character including the growth information. When displaying the character, the mobile phone 1 combines the character serving as a base image with an accessory image, and then displays the composite image. FIG. 2 is a diagram showing a display example when a character has been displayed within an image (through image) captured by the camera function of the mobile phone 1. In this instance, an image captured by the camera function with the sensor device 2 within a flower pot as a subject has been displayed on the live-view screen (monitor screen: terminal screen) as a through image, and a character (moving image) stored in advance has been displayed to be superimposed on the through image. Also, in addition to the character superimposed and displayed near the sensor device 2, an accessory image (a badge-shaped accessory in the example) combined with the character serving as a base image has been displayed on the captured image (through image). Note that, in a corner portion of the monitor screen, growth information ("optimal environment" in the example of FIG. 2) indicating a current growth condition acquired from the server device 5 is displayed, as shown in FIG. 2.

This accessory image is generated on the server device 5 side. The mobile phone 1 receives an accessory image from the server device 5, adds the accessory image to a character (base image), and displays the composite image (composite display). Specifically, the mobile phone recognizes a marker added to a subject in an image captured by the camera function as an image for distinguishing a character (base image) and transmits the distinguishing image to the server device 5. Subsequently, the server device 5 generates an accessory image based on the distinguishing image and transmits the generated accessory image to the mobile phone 1. Then, after receiving the accessory image from the server device 5, the mobile phone 1 combines the accessory image with the character (base image), and displays the composite image.

In the example of FIG. 2, this marker has been added to the sensor device 2 within the flower pot, so that the sensor device 2 is distinguished. When an image is captured with the sensor device 2 as a subject and with the marker in the center, the marker portion is extracted from the captured image and recognized as a distinguishing image. In this instance, in the extraction of the marker portion from the captured image, this portion of the image is corrected such that the marker portion appears to have been captured from above, and then extracted. However, the method of the extraction is not limited thereto, and an arbitrarily-selected method may be used. The marker is, for example, a hand-written drawing, a number, a letter or a photograph on the top plate section of the sensor device 2, and is provided to enable the sensor device 2 to be visually distinguished. In the example of FIG. 2, the number 5 has been written by hand. When the sensor device 2, or in other words, the marker is a subject, it is captured from the front direction.

When a distinguishing image and a request for registering the distinguishing image are received from the mobile phone 1, the server device 5 generates an accessory image based on the distinguishing image, and after associating the distinguishing image with the accessory image, registers them in the image database 7. In this state in which a distinguishing image and an accessory image have been associated with each other and registered in the image database 7, the mobile phone 1 requests the server device 5 to transmit an accessory image to be added to a character (base image) when displaying the character. Then, when the request to transmit an accessory image is received from the mobile phone 1, the server device 5 searches the image database 7 using a distinguishing image received together with the transmission request as distinguishing information (search key), and after reading out the corresponding accessory image, transmits it to the mobile phone 1 that has made the request.

Figure 3:
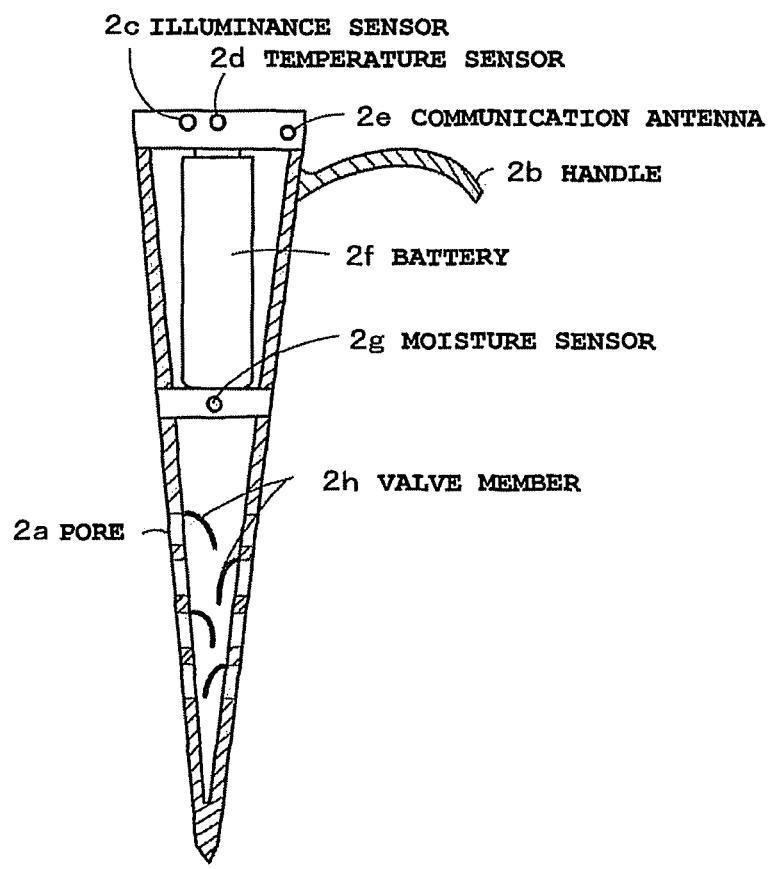
FIG. 3 is a schematic vertical cross-sectional view for describing the structure of the sensor device 2.

FIG. 3 is a schematic vertical cross-sectional view for describing the structure of the sensor device 2.

The sensor device 2 is a compact electronic device with a communication function which includes an environment sensor for observing the growth environment of plants, such as potted plants or flowers, and the housing as a whole is in the shape of an elongated hollow stick. This hollow stick-shaped body of the sensor device 2 is formed into a tapered shape, and the lower portion (such as the bottom half) thereof is inserted into the soil of a plant pot or the like. On the surface of the sensor device 2 on the lower portion side, a plurality of pores 2a for air ventilation and water conduction are formed. Also, on one side of the upper end portion of the sensor device 2, an arc-shaped handle 2b is formed (integrally formed) projecting outward. When inserting the lower portion of the sensor device 2 into the soil of a planter or removing it therefrom, the user hooks his or her index finger around the lower side of the handle 2b while pressing the upper end surface of the sensor device 2 by the pad of their thumb. As a result, the sensor device 2 can be smoothly inserted or removed.

In the top plate portion of the sensor device 2 on the upper end side, various electronic components, such as an illuminance (sunlight) sensor 2c that detects brightness around a plant, an ambient temperature sensor 2d that detects air temperature around a plant, a short-range communication section antenna 2e, a control section that controls the operations of these components, and a storage section (not shown) that sequentially stores detection results from these sensors, are included, and a power supply battery 2f is mounted below this top plate portion. In addition, in the center partition portion of the sensor device 2, a moisture sensor 2g that detects the moisture content of soil (soil humidity) is included. Moreover, in the hollow portion of the sensor device 2, a plurality of valve members 2h for preventing infiltration of soil are formed in areas where the pores 2a are formed.

Figure 4:
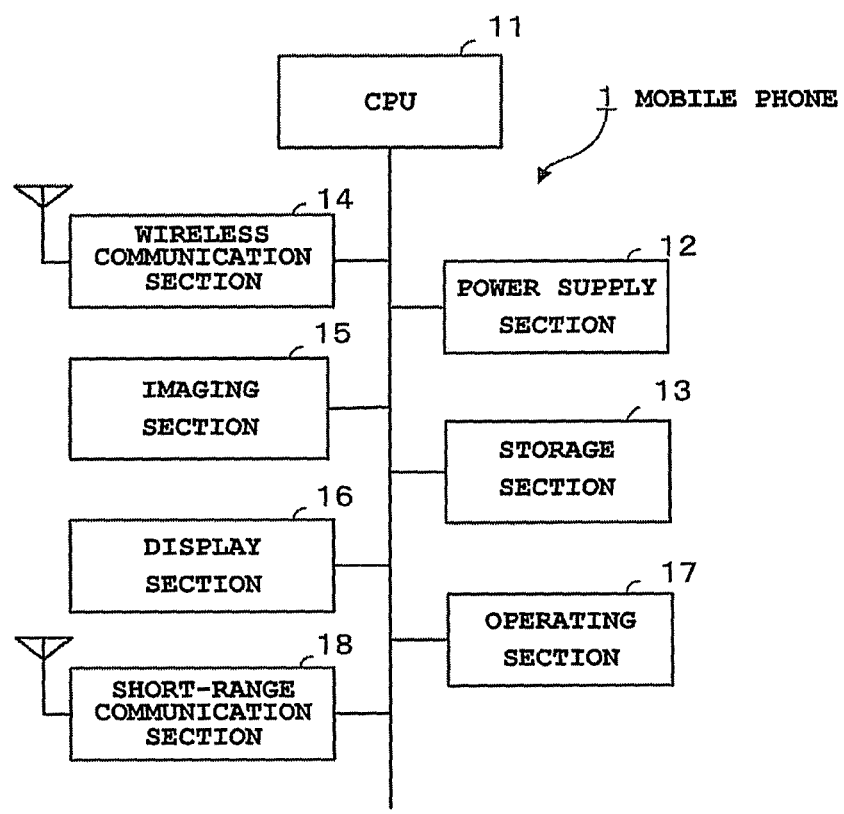
FIG. 4 is a block diagram showing basic components of the mobile phone 1.

FIG. 4 is a block diagram showing basic components of the mobile phone 1.

A central processing unit (CPU) 11 shown therein is a section that operates by receiving power from a power supply section 12 including a secondary battery (not shown), and controls the overall operation of the mobile phone 1 based on various programs stored in a storage section 13. The storage section 13 stores programs for actualizing the first embodiment based on operation procedures shown in FIG. 8 and FIG. 9, various applications, and the like, and is provided with a work area that temporarily stores various information required to operate the mobile phone 1.

A wireless communication section 14 is a wide-range communication section used for the call function, the electronic mail function, and the Internet connection function. An imaging section 15 constitutes a camera section capable of capturing a subject in high-definition, which includes an optical lens, an image sensor, an optical drive section, a flash for lighting, an analog processing circuit, a signal processing circuit, and the like (not shown). When this imaging section 15 captures an image with the sensor device 2 as a subject, the CPU 11 recognizes a drawing (marker) added to the sensor device 2 as a distinguishing image. A display section 16 includes, for example, a high-definition liquid crystal display, an organic electroluminescent (EL) display, or an electrophoretic display (electronic paper), and displays display information, such as text information and a wallpaper image. When the camera function is in use, the display section 16 serves as a finder screen, and displays a live-view image (monitor image) as a capturing image. On the surface of the display section 16, a touch screen is provided by a contact operating section (transparent contact sensor) that detects finger contact being layered over the surface.

An operating section 17 has, for example, a power ON/OFF button, a button that switches the mode of the mobile phone 1 to a camera mode, and a shutter button (not shown), and the CPU 11 performs processing corresponding to these operating buttons. A short-range communication section 18 constitutes a Bluetooth (registered trademark) module and performs communication with the sensor device 2. The communicable area is, for example, within a range of 10 meters. However, the communicable range is not limited thereto. When the mobile phone 1 transmits a search signal to find the sensor device 2, and the sensor device 2 responds to the search signal, a communication link between the mobile phone 1 and the sensor device 2 is established, and data communication can be performed therebetween.

Figure 5:
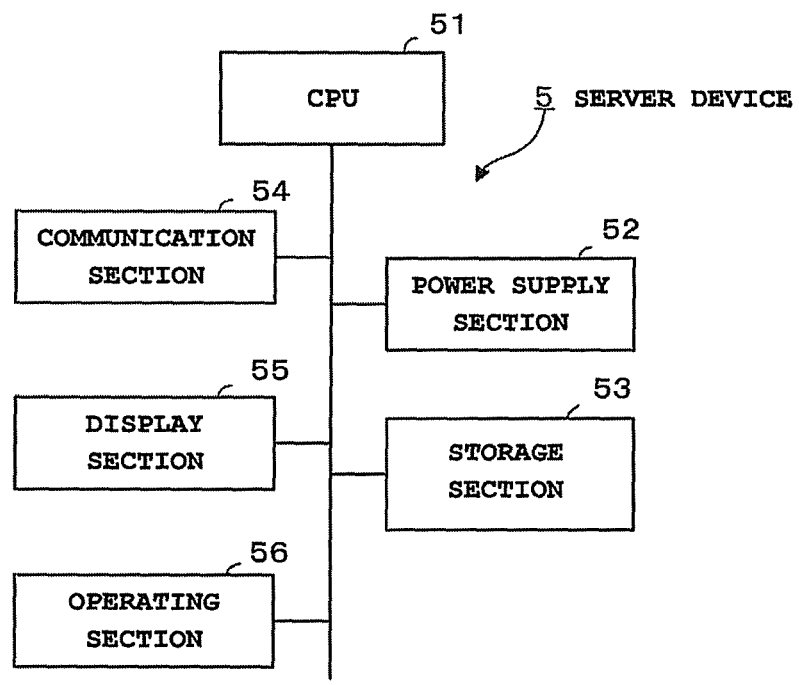
FIG. 5 is a block diagram showing basic components of the server device 5.

FIG. 5 is a block diagram showing basic components of the server device 5.

A CPU 51 shown therein is a section that operates by receiving power from a power supply section 52, and controls the overall operation of the server device 5 based on various programs stored in a storage section 53. The storage section 53 stores programs for actualizing the first embodiment based on operation procedures shown in FIG. 10 to FIG. 12, various applications, and the like. A communication section 54, a display section 55, and an operating section 56 are connected to the CPU 51 as peripheral devices. When the CPU 51 receives a distinguishing image together with a request for registering the distinguishing image from the mobile phone 1 as described above, the CPU 51 generates an accessory image based on the distinguishing image, and after associating the distinguishing image with the accessory image, registers them in the image database 7.

FIG. 6 is a diagram for explaining the image database 7. The image database 7 stores and manages a distinguishing image and an accessory image associated with each other. A record in the image database 7 is configured to include an "identification (ID)" field, a "distinguishing image" field, an "accessory image" field, an "accessory shape" field, a "registration date" field, a "date of use" field, and a "status" field. The "ID" is a serial number issued when an accessory image is newly registered, and is used as a key for retrieving the record (for example, a second search key). The "distinguishing image" is a marker added to the sensor device 2 which has been recognized as an image for distinguishing a character when an image of the sensor device 2 is captured on the mobile phone 1 side, and is used as a key for retrieving the record (for example, a first search key). The first search key is a key that is preferentially used over the second search key, ant the second search key is a key that serves as an auxiliary key for the first search key. Note that, in FIG. 6, although hand-drawn drawings of a face, letters, and a number are given as examples of the distinguishing image of the present invention, the distinguishing image is not limited thereto.

Figure 7:
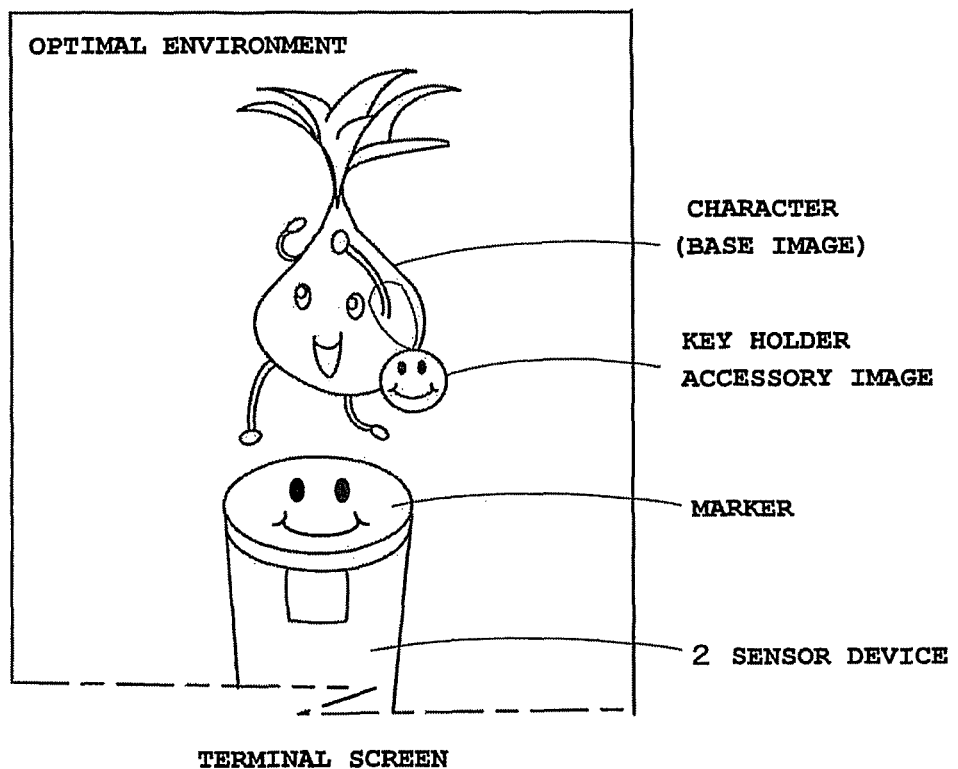
FIG. 7 is a diagram showing a display example when the accessory image of a key holder generated based on a distinguishing image has been added to a character (base image)

The "accessory image" is an image to be added to a character (base image), which is generated based on a "distinguishing image". When generating an "accessory image" based on a "distinguishing image", if the "distinguishing image" includes a letter, the server device 5 generates an accessory image of a name holder in which the letter is written. If the "distinguishing image" includes a number, the server device 5 generates an accessory image of a badge (number tag) in which the number is written. If the "distinguishing image" includes neither letter nor number, the server device 5 generates an accessory image of a key holder using the "distinguishing image". The generated accessory image is added on a predetermined position of the character (base image). FIG. 7 is a diagram showing a display example when a key holder accessory image generated based on a "distinguishing image" whose "ID" is "1" has been added to a character (base image). In this example, a distinguishing image has been used as a decorative portion attached to the ring portion of a key holder.

Although not limited thereto, the "accessory shape" indicates "key holder", "name holder", and "badge (number tag)" as the types of accessories. The "registration date" indicates the date on which an "accessory image" has been generated and registered with the "distinguishing image". The "date of use" indicates the date on which an "accessory image" has been used, and is updated at each use. The "status" indicates whether or not an "accessory image" has been unused for a long period of time. When the accessory image is not in this long-term unused state, "true" is stored in the "status" field. When it is in the long-term unused state, "false" is stored in the "status" field.

Next, the operational concepts of the mobile phone 1 and the server device 5 according to the first embodiment will be described with reference to the flowcharts shown in FIG. 8 to FIG. 12. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later.

Figure 8:
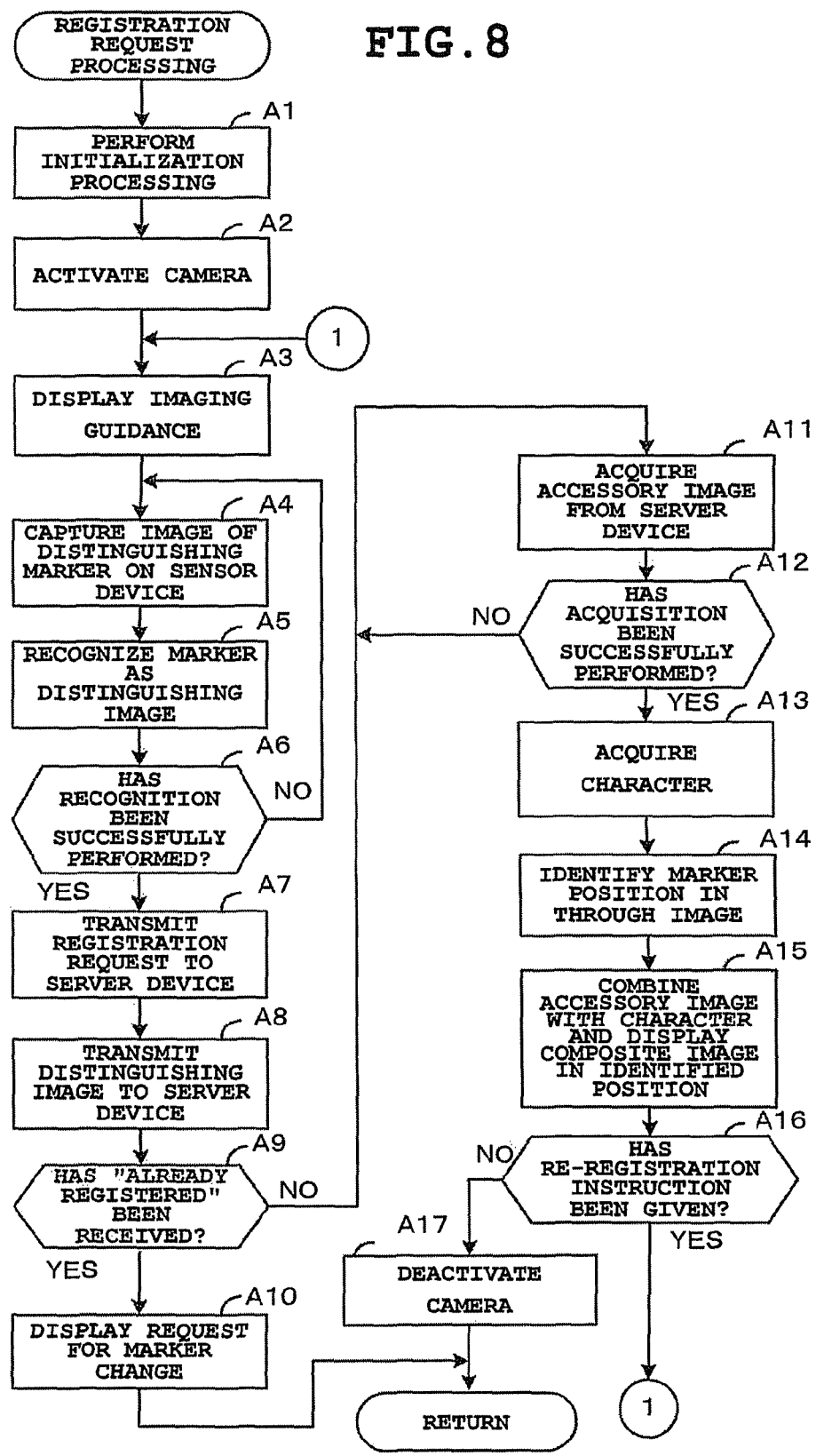
FIG. 8 is a flowchart outlining operations (registration request processing) performed when the mobile phone 1 makes a registration request for an accessory image to the server device 5.
Figure 9:
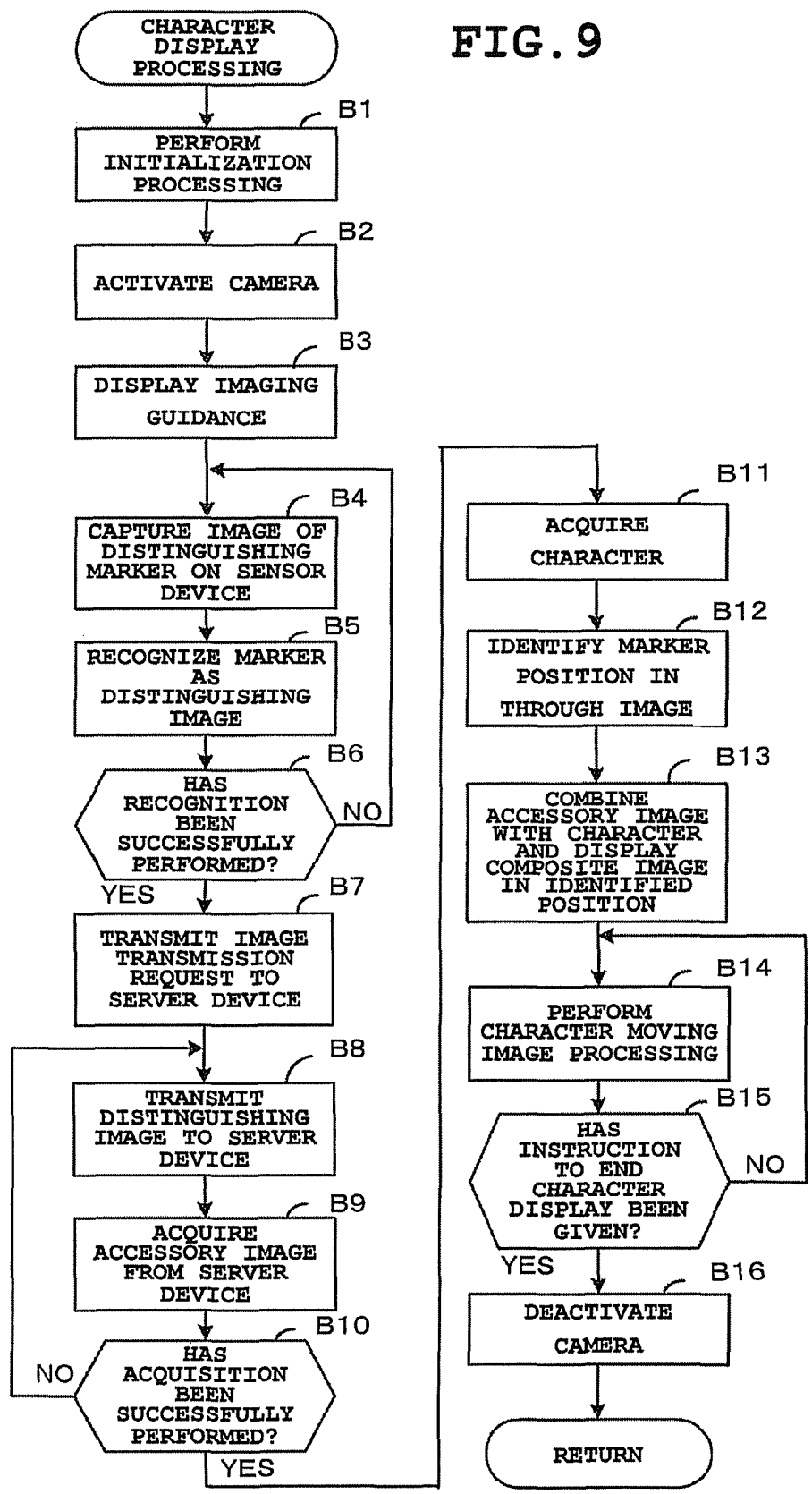
FIG. 9 is a flowchart outlining operations (character display processing) performed when a character is displayed on the mobile phone 1 side.
Figure 10:
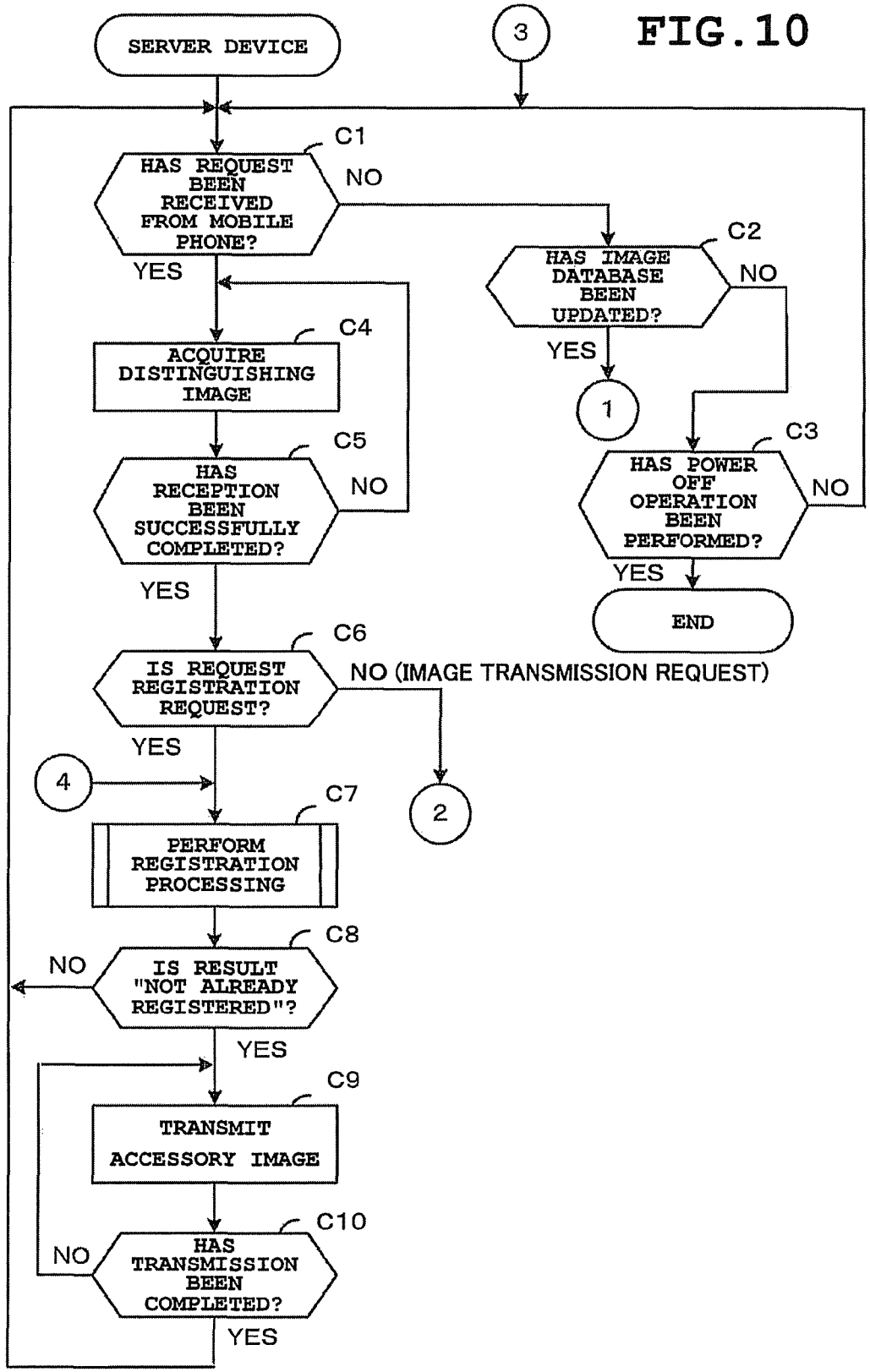
FIG. 10 is a flowchart of operations that are initiated in response to power being turned ON on the server device 5 side.
Figure 11:
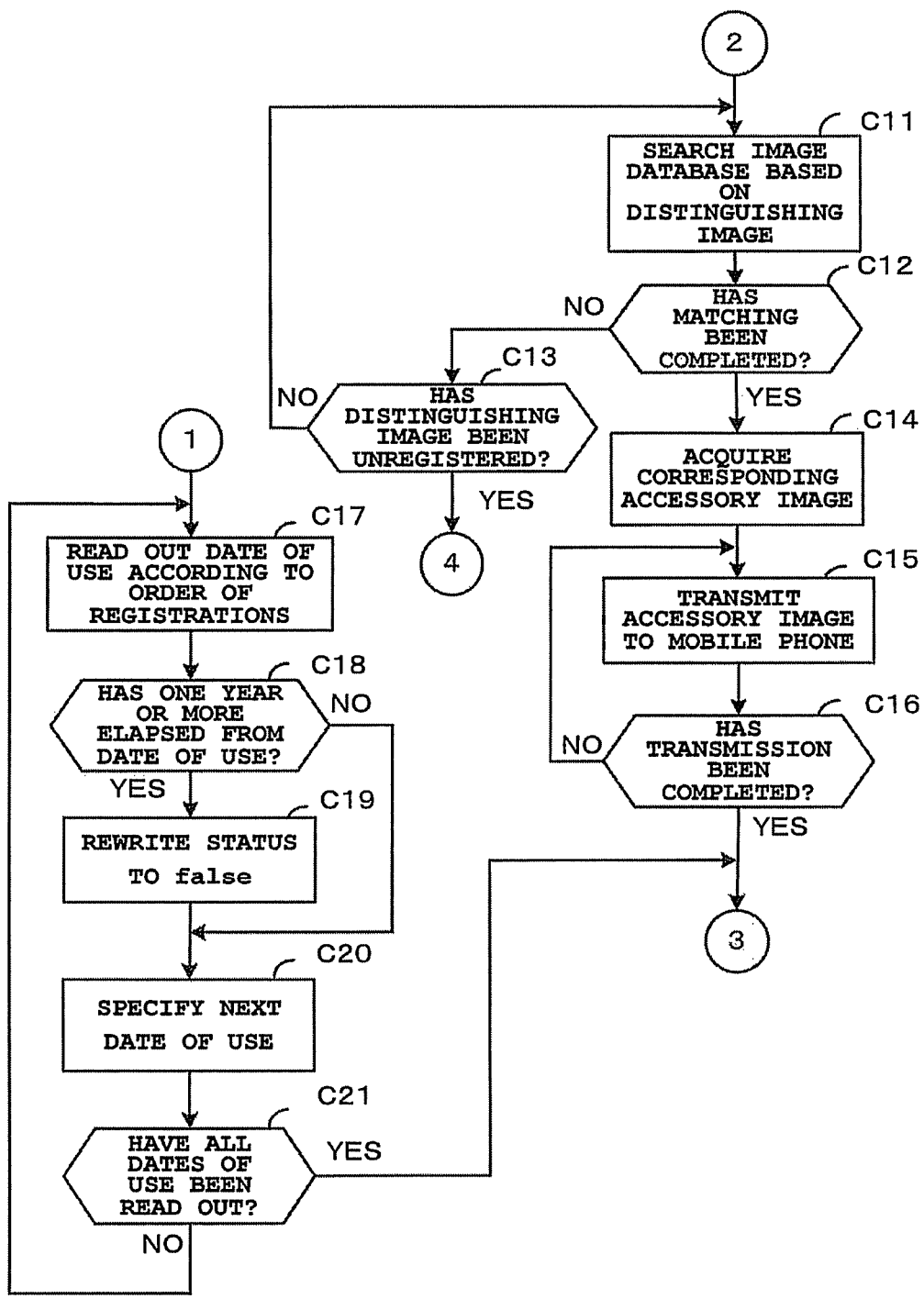
FIG. 11 is a flowchart of operations following the operations in FIG. 10.
Figure 12:
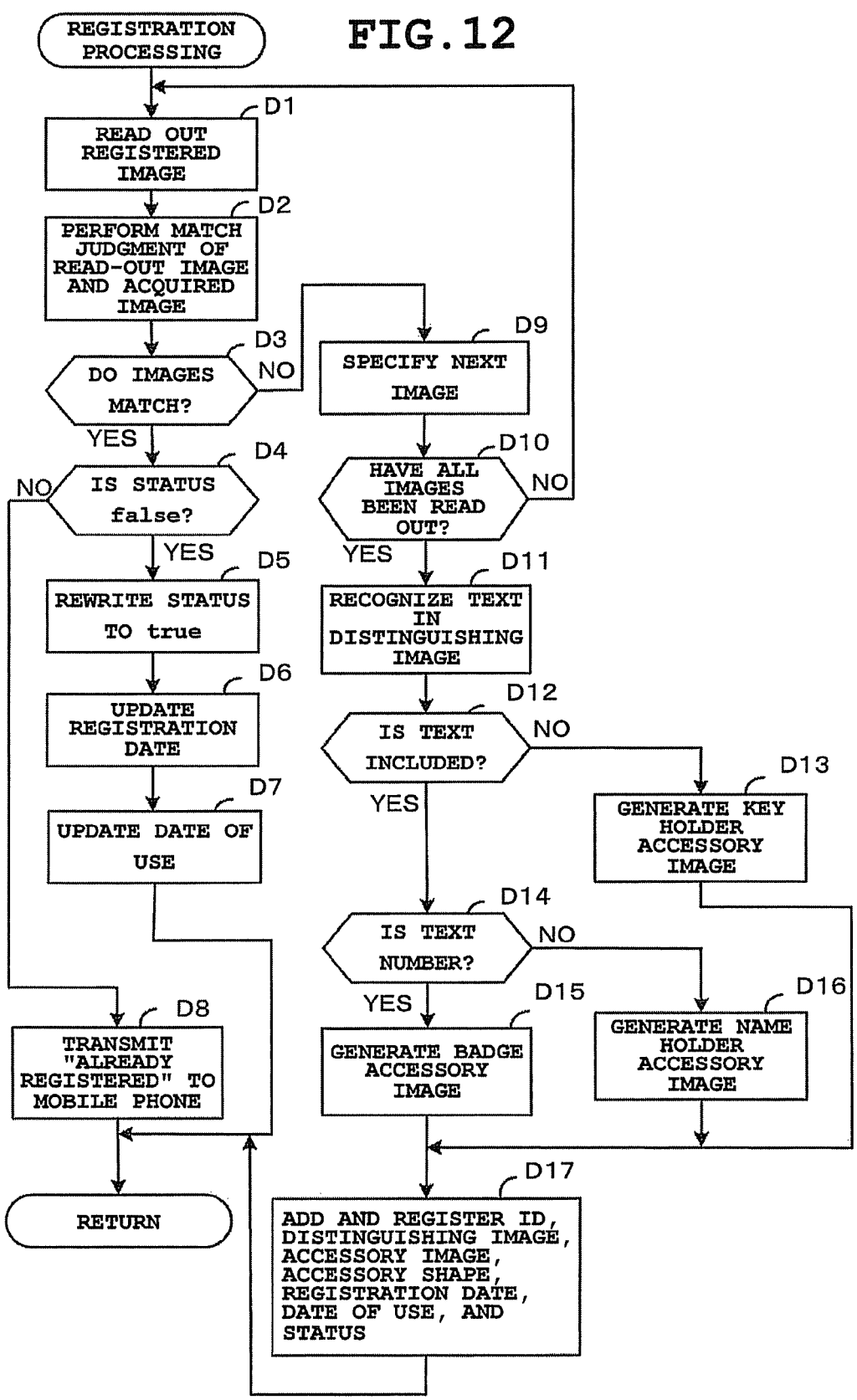
FIG. 12 is a flowchart for describing in detail registration processing by the server device 5 (Step C7 in FIG. 10)

FIG. 8 is a flowchart outlining operations (registration request processing) performed when the mobile phone 1 makes a request for registering an accessory image to the server device 5. FIG. 9 is a flowchart outlining operations (character display processing) performed when a character is displayed on the mobile phone 1 side. Note that these flowcharts in FIG. 8 and FIG. 9 outline operations of the characteristic portion of the first embodiment from among all of the operations of the mobile phone 1. After exiting the flows in FIG. 8 and FIG. 9, the procedure returns to the main flow (not shown) of the overall operation. FIG. 10 to FIG. 12 are flowcharts outlining the overall operation of the server device 5 side.

When an instruction to resister an image is given by a user operation on the mobile phone 1 side, operations based on the flowchart in FIG. 8 are initiated. First, the CPU 11 performs initialization processing (Step A1 in FIG. 8) to clear memory contents and the like, and after activating the imaging section 15 (Step A2), displays imaging guidance (Step A3). In this instance, the user directs the imaging direction of the imaging section 15 toward the sensor device 2 within a flower pot, and then operates the shutter button in this state. As a result, the CPU 11 captures an image of a distinguishing marker added to the sensor device 2 (Step A4).

Next, the CPU 11 extracts the marker portion from the captured image (through image), recognizes the marker portion as a distinguishing image (Step A5), and judges whether or not the recognition has been successfully performed (Step A6). Hereafter, until the recognition is successfully performed, the CPU 11 repeatedly returns to Step A4. Then, when judged that the marker has been successfully recognized as a distinguishing image (YES at Step A6), the CPU 11 transmits the distinguishing image and a registration request to the server device 5 for requesting image registration (Step A7), and judges whether or not "already registered" from the server device 5 has been received in response to the request (Step A8).

FIG. 10 and FIG. 11 are flowcharts of operations that are initiated in response to power being turned ON on the server device 5 side.

First, the CPU 51 judges whether or not any request has been received from the mobile phone 1 (Step C1 in FIG. 10), whether or not the time to update the contents of the image database 7 (such as 12 o'clock) has been reached (Step C2), and whether or not a power OFF operation has been performed (Step C3). When judged that a power OFF operation has been performed (YES at Step C3), the flow ends here. On the other hand, when judged that a request has been received from the mobile phone 1 (YES at Step C1), the CPU 51 initiates an operation for receiving and acquiring a distinguishing image from the mobile phone 1 (Step C4), and judges whether or not the reception has been successfully performed (Step C5). Here, until the reception is successfully performed, the CPU 51 repeatedly returns to Step C4. Then, when judged that the distinguishing image has been successfully received and acquired (YES at Step C5), and the request is a registration request (YES at Step C6), the CPU 51 proceeds to the registration processing for registering the image (Step C1).

FIG. 12 is a flowchart for describing the details of the registration processing by the server device 5 (Step C7 in FIG. 10).

First, the CPU 51 reads out a "distinguishing image" from "distinguishing images" registered in the image database 7, according to the order of their registrations (Step D1). Then, the CPU 51 performs match judgment for judging whether or not the distinguishing image that has been read out matches the distinguishing image acquired from the mobile phone 1 by comparing them (Step D2). When judged that these two distinguishing images do not match (NO at Step D3), the CPU 51 specifies the next registered "distinguishing image" (Step D9). Hereafter, until all the "distinguishing images" in the image database 7 are specified (YES at Step D10), the CPU 51 repeatedly returns to Step D1 and performs match judgment while specifying each registered "distinguishing image" (Step D2, Step D3, and Step D9).

When one of the "distinguishing images" in the image database 7 is judged to match the distinguishing image acquired from the mobile phone 1 (YES at Step D3), the CPU 51 judges that an image that is the same as the "distinguishing image" for which the registration request is being made has already been registered, and proceeds to Step D4. At Step D4, the CPU 51 judges whether or not the "status" corresponding to this already registered "distinguishing image" is "false" indicating a long-term unused state. When judged that the "status" is "true" indicating that the "distinguishing image" is not in a long-term unused state (NO at Step D4), the CPU 51 transmits a notification indicating that the same image has already been registered to the mobile phone 1 that has made the request (Step D8), and exits the flow in FIG. 12.

When judged that the "status" is "false" (YES at Step D4), the CPU 51 rewrites the already registered contents with the registration contents of the current request. That is, the CPU 51 rewrites the already registered contents to new registration contents using its contents as they are (Step D5 to Step D7). In this instance, after rewriting the "status" to "true" to perform new registration for the current registration request (Step D5), the CPU 51 performs processing to update the "registration date" to the current date (Step D6) and update the "date of use" to the current date (Step D7). After rewriting the registration contents as described above, the CPU 51 exits the flow in FIG. 12.

At Step D10, if match judgment is not performed even when all the distinguishing images are read out, or in other words, if there is no registered image that is the same as the distinguishing image for which the registration request is being made (NO at Step D10), the CPU 51 performs processing for generating an accessory image based on this distinguishing image, prior to performing new registration in response to the current request (Step D11 to Step D16). Specifically, the CPU 51 analyzes the distinguishing image to perform text recognition (Step D11), and judges whether or not text is included therein (Step D12). When judged that text is not included (NO at Step D12), the CPU 51 generates a key holder accessory image using the distinguishing image (Step D13).

Conversely, when judged that text is included in the distinguishing image (YES at Step D12), the CPU 51 judges whether or not the text is a number (Step D14). When judged that the text is a number (YES at Step D14), the CPU 51 generates a badge (number tag) accessory image in which the number is written (Step D15). When judged that the text is a letter (NO at Step D14), the CPU 51 generates a name holder accessory image in which the letter is written (Step D16). When the accessory image is generated as described above, the CPU 51 issues a new ID, and after generating a new record composed of "ID", "distinguishing image", "accessory image", "accessory shape", "registration date", "date of use", and "status", adds and registers the new record at the end of the image database 7 (Step D17). During this new registration, "true" is stored as the "status". Then, the CPU 51 exits the flow in FIG. 12.

When the registration processing described above is completed (Step C7 in FIG. 10), the server device 5 judges whether or not the registration processing result is "not already registered" (Step C8). When judged that the result is "already registered" (NO at Step C8), the server device 5 returns to Step C1 in preparation for a re-registration request. When judged that the result is "not already registered" (YES at Step C8), the server device 5 reads out the newly generated "accessory image" and transmits this "accessory image" to the mobile phone 1 that has made the request (Step C9). The server device 5 then judges whether or not the transmission has been completed (Step C10). Hereafter, until the transmission is completed, the server device 5 repeatedly returns to Step C9. When the transmission is completed (YES at Step C10) the server device 5 returns to Step C1.

Here, after transmitting the distinguishing image to the server device 5, the mobile phone 1 judges whether or not "already registered" from the server device 5 has been received in response to the request (Step A9 in FIG. 8). When judged that "registered" has been received (YES at Step A9), the mobile phone 1 displays, on the display section 16, guidance requesting the user to change the marker of the sensor device 2 to a different marker (Step A10), and exits the flow in FIG. 8. When judged that "not already registered" has been received (NO at Step A9), the mobile phone 1 receives and acquires the accessory image from the server device 5 and judges whether or not the acquisition of the accessory image has been successfully performed (Step A12). Hereafter, until the accessory image is successfully received and acquired, the mobile phone 1 repeatedly returns to Step A11.

When the reception and acquisition of the accessory image is completed (YES at Step A12), the mobile phone 1 reads out and acquires a character stored in advance (Step A13). Then, in a state where the image captured by the imaging section 15 is being displayed on the monitor screen as a through image, the mobile phone 1 identifies the position of the marker added on the sensor device 2 that is the subject of the image (Step A14). Next, the mobile phone 1 combines the accessory image with the acquired character, and displays the composite image such that it is superimposed on the identified position in the through image (Step A15). In this instance, when combining the accessory image with the character, the mobile phone 1 combines the accessory image such that it is positioned in an area based on the accessory shape. Then, the mobile phone 1 judges whether or not a re-registration instruction has been given by a user operation (Step A16). When judged that a re-registration instruction has not been given (NO at Step A16), the mobile phone 1 stops the imaging section 15 (Step A17) and exits the flow in FIG. 8. Conversely, when judged that a re-registration instruction has been given (YES at Step A16), the mobile phone 1 returns to Step A3 for requesting the server device 5 to perform re-registration.

At Step C2, when judged that the time to update the contents of the image database 7 (such as 12 o'clock) has been reached (YES at Step C2), the server device 5 proceeds to the flow in FIG. 11 and reads out a "date of use" from the image database 7, according to the order of the registrations (Step C17). Subsequently, the server device 5 judges whether or not a year or more has elapsed from the read out "date of use" by comparing the "date of use" with the current date (Step C18), and rewrites the contents of a "status" corresponding to the "date of use" to "false" (Step C19). Then, the server device 5 specifies the next "date of use" (Step C20) and judges whether or not all the "dates of use" have been read out (Step C21). Hereafter, until all the "dates of use" are read out, the server device 5 repeatedly returns to Step C17 and performs the operation for rewriting a "status" for a "date of use" from which a year or more has elapsed to "false" (Step C19). When judged that all the "dates of use" have been specified (YES at Step C21), the server device 5 returns to Step C1 in FIG. 10.

On the mobile phone 1 side, when an instruction for character display is given by a user operation, operations based on the flow in FIG. 9 are initiated. First, the CPU 11 performs initialization processing (Step B1 in FIG. 9) to clear memory contents and the like, and after activating the imaging section 15 (Step B2), displays imaging guidance (Step B3). In this instance, the user directs the imaging direction of the imaging section 15 toward the sensor device 2 within a flower pot, and then operates the shutter button in this state. When an image of the distinguishing marker of the sensor device 2 is captured thereby (Step B4), the CPU 11 recognizes the marker from the captured image (through image), as a distinguishing image (Step B5). Subsequently, the CPU 11 judges whether or not the recognition has been successfully performed (Step B6). Hereafter, until the recognition is successfully performed, the CPU 11 returns to Step A4. Then, when judged that the marker has been successfully recognized as a distinguishing image (YES at Step B6), the CPU 11 transmits the distinguishing image and an image transmission request to the server device 5 for requesting the transmission of an accessory image (Step B7).

When judged that a request has been received from the mobile phone 1 (YES at Step C1 in FIG. 10), the server device 5 judges whether or not the request is a registration request (Step C6). When judged that the request is not a registration request (NO at Step C6), the server device 5 judges that the request is a transmission request for an accessory image, and proceeds to Step C11 in FIG. 11. At Step C11, the server device 5 searches each "distinguishing image" in the image database 7 based on the distinguishing image transmitted from the mobile phone 1. At Step C12, the server device 5 judges whether or not a matching distinguishing image has been retrieved (whether or not the matching has been completed) (Step C12). When judged that the matching has not been completed (NO at Step C12), the server device 15 judges whether or not the distinguishing image received from the mobile phone 1 has been unregistered (has not been registered) in the image database 7 (Step C13).

When judged that the distinguishing image has been unregistered (YES at Step C13), the server device 5 proceeds to Step C7 in FIG. 10 and performs the registration processing. At Step C12, when judged the matching has been completed (YES at Step C12), the server device 5 reads out and acquires the corresponding "accessory image" from the image database 7 (Step C14). Then, the server device 5 transmits the "accessory image" to the mobile phone 1 that has made the request (Step C15), and judges whether or not the transmission has been completed (Step C16). Hereafter, until the transmission is completed, the server device 5 repeatedly returns to Step C15. When judged that the transmission has been completed (YES at Step C16), the server device 5 returns to Step C1 in FIG. 10.

After transmitting the distinguishing image to the server device 5 (Step B8 in FIG. 9), the mobile phone 1 receives and acquires the accessory image transmitted from the server device 5 in response the request (Step B9), and judges whether or not the acquisition has been successfully performed (Step B10). Hereafter, until the acquisition is successfully performed, the mobile phone 1 repeatedly returns to Step B8 and retransmits the distinguishing image to the server device 5. When judged that the reception and acquisition of the accessory image has been completed (YES at Step B10), the mobile phone 1 reads out and acquires a character stored in advance (Step B11) and identifies the position of the marker added on the sensor device 2 in the through image (Step B12).

Then, the mobile phone 1 displays a composite image created by the accessory image being combined with the character such that it is superimposed on the identified position in the through image (Step B13). In this instance, when combining the accessory image with the character, the mobile phone 1 combines the accessory image such that it is positioned in an area based on the accessory shape. Then, the mobile phone 1 starts moving image processing to move the character, and repeats this character moving image processing (Step B14) until an instruction to end the character display is given (YES at Step B15). When an instruction to end the display is given by a user operation or the like (YES at Step B15), the mobile phone 1 deactivates the imaging section 15 (Step B16) and exits the flow in FIG. 9.

As described above, the first embodiment is an image communication system in which the transmission and reception of images are performed between the mobile phone 1 that displays a base image (character) combined with an accessory image and the server device 5, via a communication network. When an image of a subject is captured by the imaging section 15 on the mobile phone 1 side, the subject in the captured image is recognized as an image for distinguishing a character, and an accessory image is generated based on the recognized distinguishing image. As a result, a highly distinct accessory image using the subject is generated. Therefore, even when there are similar base images (characters), each character can be easily distinguished.

In addition, when an image of a subject is captured by the imaging section 15, the mobile phone 1 recognizes the subject in the captured image as an image for distinguishing a character and transmits the distinguishing image to the server device 5. Then, the server device 5 generates an accessory image based on the distinguishing image received from the mobile phone 1 and transmits the accessory image to the mobile phone 1. Therefore, duplicate generation of the same contents, which is a hindrance when accessory images are individually generated for each mobile phone 1, can be prevented.

Moreover, since different types of accessory images are generated according to the contents of a distinguishing image, even when the same subject is captured, its accessory image can be changed according to the contents.

Furthermore, since an accessory image including a distinguishing image is generated, a subject itself can be used as an accessory image.

Still further, when a request for registering a distinguishing image is received from the mobile phone 1 side, the server device 5 associates the distinguishing image with a generated accessory image and registers them in the image database 7. Also, when a request to transmit an accessory image corresponding to a distinguishing image is received from the mobile phone 1, the server device 5 searches the image database 7 based on the distinguishing image, and after acquiring the corresponding accessory image, transmits the accessory image to the mobile phone 1 that has made the request. Therefore, accessory images can be managed exclusively on the server device 5 side, and a distinguishing image can be used to retrieve an accessory image.

Yet still further, a distinguishing marker added to the sensor device (subject) 2 in a captured image is recognized as a distinguishing image for a character. Therefore, the sensor device 2 can be distinguished by its accessory image.

Yet still further, when an image of a distinguishing marker added to the sensor device (subject) 2 is captured, the mobile phone 1 adds a character near the marker, and after combining an accessory image received from the server device 5 with the character, displays the composite image. Therefore, a character having an accessory image can be displayed near the sensor device 2 simply by an image of the sensor device 2 being captured. In addition, the sensor device 2 can be distinguished by its accessory image.

In the configuration of the above-described first embodiment, the recognition of a distinguishing image is performed on the mobile phone 1 side. However, this recognition of a distinguishing image may be performed on the server device 5 side.

In addition, in the above-described first embodiment, different types of accessory images (key holder, name holder, and badge) are generated according to the contents of a distinguishing image (based on whether it includes text, numbers, or letters). However, a configuration may be adopted in which the type of accessory is specified by a user operation in advance. In this configuration, when the mobile phone 1 transmits the type of accessory specified by the user to the server device 5, processing for generating an accessory image of the type specified by the user is performed on the server device 5 side, instead of the above-described accessory image generation processing (Step D11 to Step D16 in FIG. 12). Also, a configuration may be adopted in which, when the type of accessory has been specified by the user, an accessory image of the type specified by the user is preferentially generated, and when the type of accessory has not been specified by the user, the above-described accessory image generation processing (Step D11 to Step D16 in FIG. 12) is performed. With this configuration in which the type of accessory is arbitrarily specified by user operation, user preference can be incorporated and accessory images having more originality can be generated.

(Second Embodiment)

A second embodiment of the present invention will hereinafter be described with reference to FIG. 13 and FIG. 14. In the above-described first embodiment, the present invention has been applied to an image communication system (plant growth management system) in which the transmission and reception of images are performed between the mobile phone 1 and the server device 5 via a communication network. However, in the second embodiment, the present invention has been applied to the mobile phone 1 alone. Note that sections that are basically the same in both embodiments and sections having the same name in both embodiments are given the same reference numerals, and descriptions thereof are omitted. Further, note that in the descriptions below, the characteristic portion of the second embodiment will mainly be described. In this second embodiment, the plant growth database 6 and the image database 7 are provided on the mobile phone 1 side.

Figure 13:
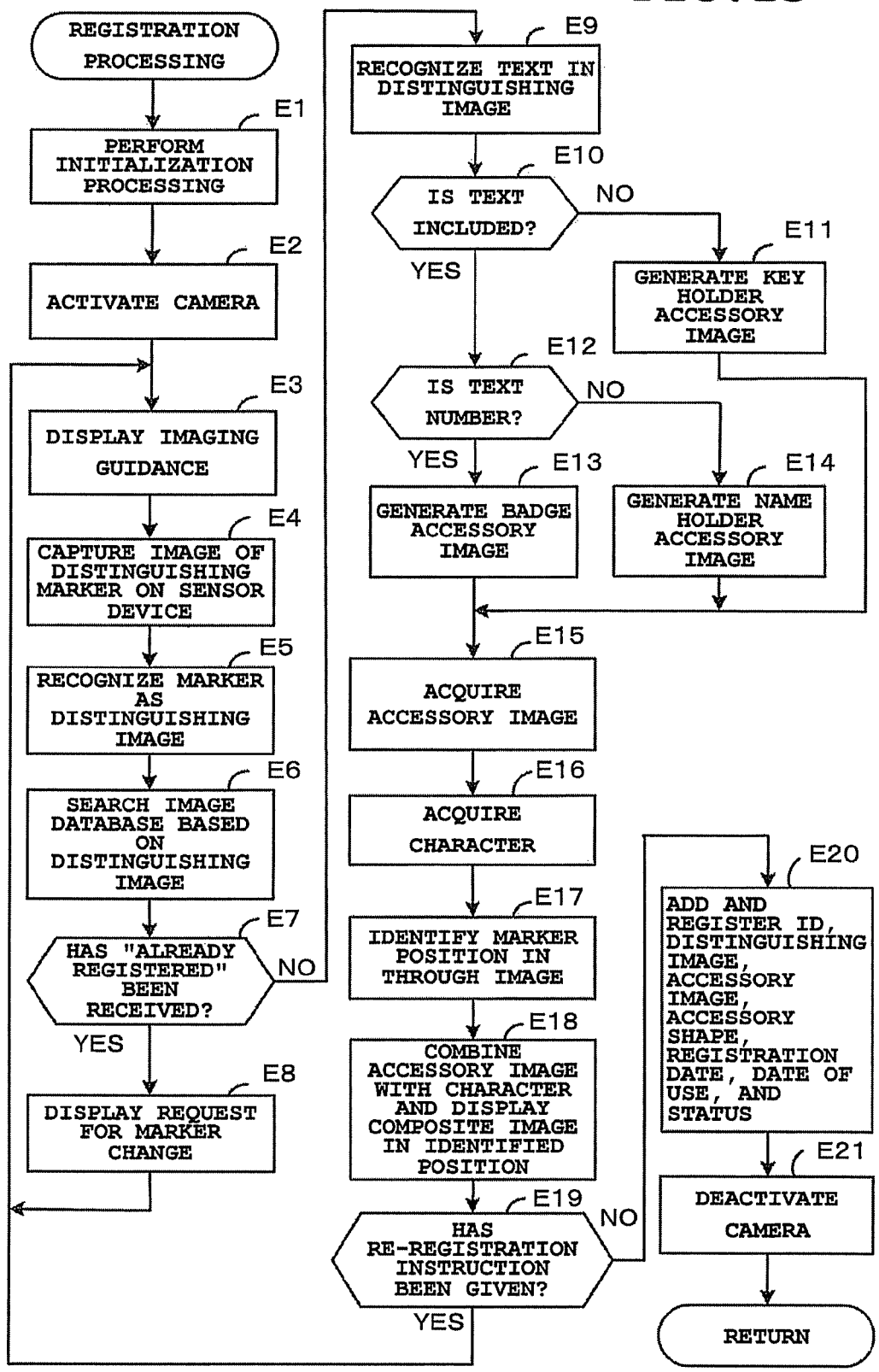
FIG. 13 is a flowchart outlining operations (registration processing) performed when an accessory image is registered in the image database 7 in a second embodiment.

FIG. 13 is a flowchart outlining operations (registration processing) performed when an accessory image is registered. The registration processing according to the second embodiment is basically the same as that of the first embodiment.

First, the mobile phone 1 performs initialization processing (Step E1) to clear memory contents and the like, and after activating the imaging section 15 (Step E2), displays imaging guidance (Step E3). Then, when an image of a distinguishing added to the sensor device 2 is captured thereby (Step E4), the mobile phone 1 recognizes the marker from the captured image (through image), as a distinguishing image (Step E5).

Then, the mobile phone 1 searches each "distinguishing image" in the image database 7 based on the distinguishing image (Step E6) and judges whether or not the distinguishing image has already been registered (Step E7). When judged that the distinguishing image has already been registered (YES at Step E7) the mobile phone 1 displays a request to change the marker (Step E8) and returns to Step E2 to receive re-registration. Conversely, when judged that the distinguishing image has not been registered (NO at Step E7), the mobile phone 1 performs processing for generating an accessory image based on the distinguishing image for which the registration request has been made, prior to performing new registration in response to the current request (Step E9 to Step E14). That is, the mobile phone analyzes the distinguishing image and performs text recognition (Step E9). When text is not included (NO at Step E10), the mobile phone 1 generates a key holder accessory image using the distinguishing image (Step E11).

When text is included in the distinguishing image (YES at Step E10), if the text is a number (YES at Step E12), the mobile phone 1 generates a badge (number tag) accessory image in which the number is written (Step E13). When judged that the text is a letter (NO at Step E12), the mobile phone 1 generates a name holder accessory image in which the letter is written (Step E14). Then, the mobile phone 1 acquires the accessory image generated thereby (Step E15), and reads out and acquires a character stored in advance (Step E16).

Subsequently, in a state where the image captured by the imaging section 15 is being displayed on the live-view screen (monitor screen) as a through image, the mobile phone 1 identifies the position of the marker added on the sensor device 2 that is the subject of the image (Step E17). Next, the mobile phone 1 combines the accessory image with the character, and displays the composite image such that it is superimposed on the identified position in the through image (Step E18). In this instance, when combining the accessory image with the character, the mobile phone 1 combines the accessory image such that it is positioned in an area based on the accessory shape. Then, the mobile phone 1 judges whether or not a re-registration instruction has been given by a user operation (Step E19). When judged that a re-registration instruction has been given (YES at Step E19), the mobile phone 1 returns to Step E3 to perform re-registration. Conversely, when judged that a re-registration instruction has not been given (NO at Step E19), the mobile phone 1 issues a new ID, and after generating a new record composed of "ID", "distinguishing image", "accessory image", "accessory shape", "registration date", "date of use", and "status", adds and registers the new record at the end of the image database 7 (Step E20). Then, the mobile phone 1 deactivates the imaging section 15 (Step E21) and exits the flow in FIG. 13.

Figure 14:
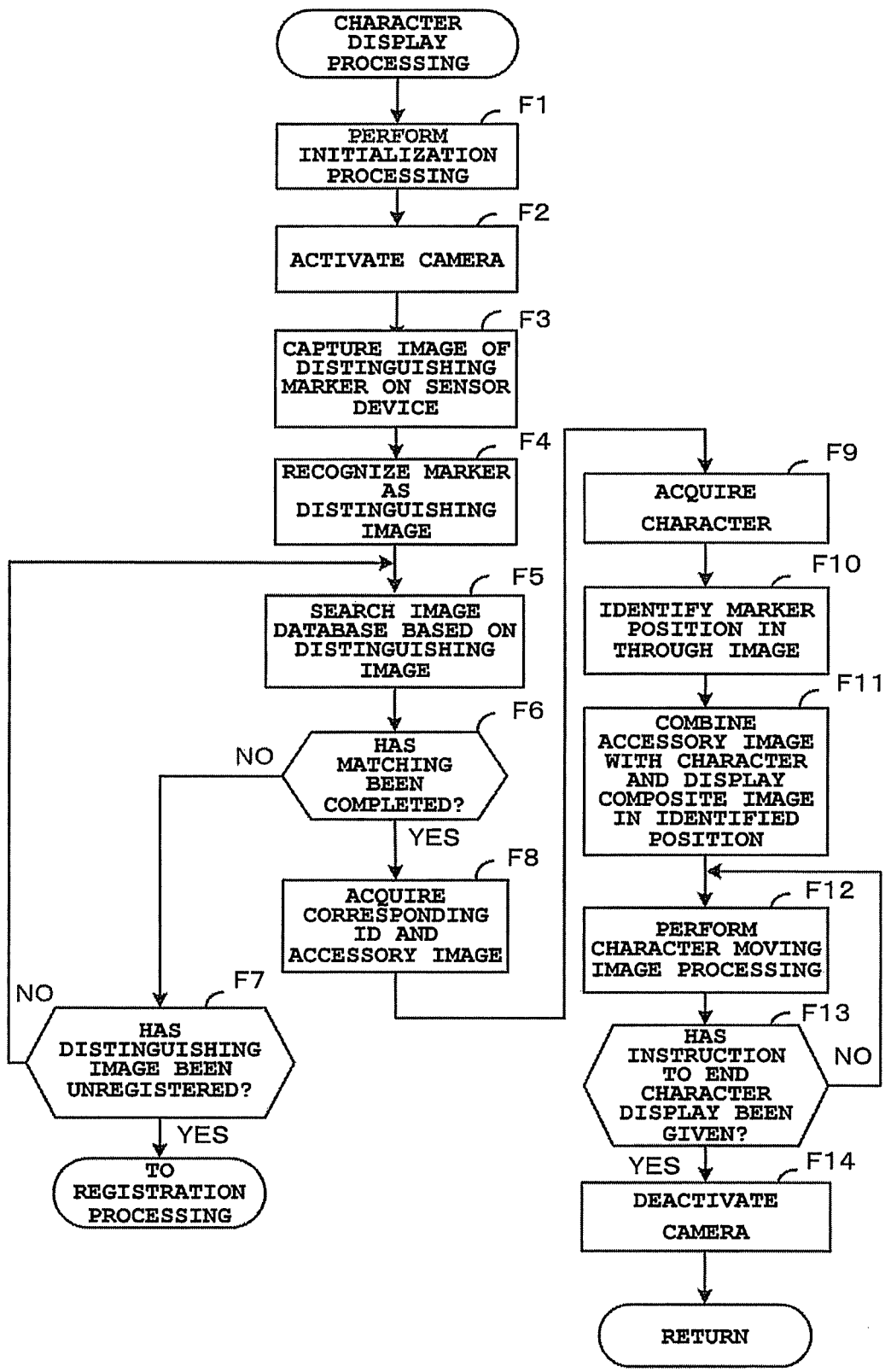
FIG. 14 is a flowchart outlining operations (character display processing) performed when a character is displayed on the mobile phone 1 side in the second embodiment.

FIG. 14 is a flowchart outlining operations (character display processing) performed when a character is displayed on the mobile phone 1 side. The character display processing according to the second embodiment is also basically the same as that of the first embodiment.

First, the mobile phone 1 performs initialization processing (Step F1) to clear memory contents and the like, and activates the imaging section 15 (Step F2). Then, when an image of a distinguishing marker added to the sensor device 2 is captured thereby (Step F3), the CPU 11 recognizes the marker from the captured image (through image), as a distinguishing image (Step F4). Next, the mobile phone 1 searches each "distinguishing image" in the image database 7 based on the distinguishing image (Step F5), and judges whether or not a matching distinguishing image has been retrieved (matching has been completed) (Step F6). When judged that the matching has not been completed (NO at Step F6), the mobile phone 1 judges whether or not the distinguishing image has been unregistered (has not been registered) in the image database 7 (Step F7).

When judged that the distinguishing image has been unregistered (YES at Step F7), the mobile phone 1 performs the registration processing in FIG. 13. At Step F6, when judged that the matching has been completed (YES at Step F6), the mobile phone 1 reads out and acquires the corresponding "accessory image" from the image database 7 (Step F8). Subsequently, the mobile phone 1 reads out and acquires a character stored in advance (Step F9) and identifies the position of the marker added on the sensor device 2 in the through image (Step F10). Then, the mobile phone 1 displays a composite image created by the accessory image being combined with the character such that it is superimposed on the identified position in the through image (Step F11). In this instance, when combining the accessory image with the character, the mobile phone 1 combines the accessory image such that it is positioned in an area based on the accessory shape. Then, the mobile phone 1 starts moving image processing to move the character (Step F12), and repeats this character moving image processing (Step F12) until an instruction to end the character display is given (YES at Step F13). When an instruction to end the display is given by a user operation or the like (YES at Step F13), the mobile phone 1 deactivates the imaging section 15 (Step F14) and exits the flow in FIG. 14.

As described above, when an image of a subject is captured by the imaging section 15, the mobile phone 1 according to the second embodiment recognizes the subject in the captured image as an image for distinguishing the character and generates an accessory image based on the recognized distinguishing image. As a result, a highly distinct accessory image using the subject is generated. Therefore, even when there are similar base images (characters), each character can be easily distinguished.

In addition, since the mobile phone 1 generates different types of accessory images according to the contents of a distinguishing image, even when the same subject is captured, its accessory image can be changed according to the contents.

Moreover, since the mobile phone 1 generates an accessory image including a distinguishing image, a subject itself can be used as an accessory image.

Furthermore, the mobile phone 1 associates a distinguishing image and a generated accessory image and registers them in the image database 7. Then, when displaying the character, it searches the image database 7 based on the distinguishing image and acquires the corresponding accessory image. Therefore, various types of generated accessory images can be uniformly managed, and a distinguishing image can be used to retrieve an accessory image.

Still further, the mobile phone 1 recognizes a distinguishing marker added to the sensor device 2 in a captured image as a distinguishing image for a character. Therefore, the sensor device 2 can be distinguished by its accessory image.

Yet still further, when an image of a distinguishing marker added to the sensor device (subject) 2 is captured, the mobile phone 1 adds a character near the marker, and after combining an accessory image with the character, displays the composite image. Therefore, a character having an accessory image can be displayed near the sensor device 2 simply by an image of the sensor device 2 being captured. In addition, the sensor device 2 can be distinguished by its accessory image.

In the configuration of the second embodiment, different types of accessory images (key holder, name holder, and badge) are generated according to the contents of a distinguishing image (based on whether it includes text, and numbers or letters). However, a configuration may be adopted in which the type of accessory is specified by a user operation in advance. In this configuration, the mobile phone 1 performs processing for generating an accessory image of a type specified by the user, instead of the above-described accessory image generation processing (Step E9 to Step E14 in FIG. 13). Also, a configuration may be adopted in which, when the type of accessory has been specified by the user, an accessory image of the type specified by the user is preferentially generated, and when the type of accessory has not been specified by the user, the above-described accessory image generation processing (Step E9 to Step E14 in FIG. 13) is performed. With this configuration in which the type of accessory is arbitrarily specified by user operation, user preference can be incorporated and accessory images having more originality can be generated.

Additionally, in the above-described embodiments, the "distinguishing image" is used as the search key for the search of the image database 7. However, the present invention is not limited thereto and a configuration may be adopted in which, when the search using the "distinguishing image" fails, search using the "ID" as the key is performed. Alternatively, a configuration may be adopted in which the search using the "distinguishing image" as the search key is not performed and only the search using the "ID" as the key is performed.

Moreover, advice in the above-described embodiments may be given to a user using sensory or experiential methods through a combination of the camera function and augmented reality (AR) technology. In this instance, a configuration may be applied in which a plant, which is incapable of self-expression, is humanized and personified through an anthropomorphic advice presentation by an AR character. As a result, the emotional value of virtually experiencing the feelings of a plant through the character and the realistic value of reducing the difficulty of plant management and cultivation can be provided to the user.

Furthermore, although in the above-described embodiments the growth subjects are plants, the present invention is not limited thereto. The growth subjects may be fish, birds such as parakeets and Java sparrows, dogs, cats, etc. In these cases, a pet environment or a fish tank environment in the rearing room of a store or the like may be measured, and the sensor device 2 may be provided in a collar for dogs, cats and the like, or inside a fish tank. In addition, the invention is not limited to use in cultivation, and may be used in communication using anthropomorphic characters (avatars) via a network. Moreover, the subject is not limited to the above-described marker on the sensor device 2, and may be a person, scenery, etc.

Still further, in the above-described embodiments, the present invention has been applied to a mobile phone, as an information terminal device. However, the present invention may be applied to a personal digital assistant (PDA), a digital camera, a music player, a personal computer (PC), etc.

Yet still further, the "devices" or the "sections" described in the above-described embodiments are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image communication system including a terminal device and a management device, comprising:
   a storing section which prestores a base image;
   an imaging section which captures an image of a subject in the terminal device;
   a recognizing section which recognizes the subject in the image captured by the imaging section as a distinguishing image for the base image;
   a generating section which generates an accessory image based on the distinguishing image:
   a first combining section which generates a first composite image by combining the accessory image with the base image;
   a second combining section which generates a second composite image by combining the first composite image with the distinguishing image such that the first composite image is positioned near the distinguishing image when the distinguishing image for the subject is captured by the image section; and
   a display section which displays the second composite image on the terminal device.

2. The image communication system according to claim 1, wherein the terminal device comprises:
   the imaging section;
   the recognizing section: a transmitting section;
   a receiving section; and
   the display section,
   the transmitting section transmits the distinguishing image recognized by the recognizing section to the management device,
   the receiving section receives the first composite image from the management device,
   the display section displays the first composite image received by the receiving section, and
   wherein the management device comprises: a distinguishing image receiving section;
   the generating section;
   the first combining section: and a generated image transmitting section,
   the distinguishing image receiving section receives the distinguishing image from the terminal device,
   the generating section generates the accessory image based on the distinguishing image when the distinguishing image is received from the terminal device, and
   the generated image transmitting section transmits the first composite image to the terminal device.

3. The image communication system according to claim 2, wherein the generating section generates different types of accessory images according to contents of the distinguishing image.

4. The image communication system according to claim 2, wherein the management device further comprises a selecting section which selects type of accessory based on a user operation.

5. The image communication system according to claim 2, wherein the generating section generates an accessory image including the distinguishing image.

6. The image communication system according to claim 2, wherein the management device further comprises:
 a registering section which associates the distinguishing image from the terminal device and the accessory image generated by the generating section, and registers the distinguishing image and the accessory image, when a registration request for the distinguishing image is received from the terminal device;
 an acquiring section which acquires the accessory image corresponding to the distinguishing image by searching contents registered by the registering section based on the distinguishing image from the terminal device, when a transmission request for the accessory image corresponding to the distinguishing image is received from the terminal device; and
 a registration image transmitting section which transmits the accessory image acquired by the acquiring section to the terminal device that has made the transmission request.

7. The image communication system according to claim 2, wherein the recognizing section recognizes a distinguishing drawing added to the subject in the image captured by the imaging section as the distinguishing image for the base image.

8. The image communication system according to claim 2, wherein the display section displays the second composite image.

9. A terminal device comprising:
 a storing section which prestores a base image;
 an imaging section which captures an image of a subject;
 a recognizing section which recognizes the subject in the image captured by the imaging section as a distinguishing image for a base image;
 a generating section which generates an accessory image based on the distinguishing image recognized by the recognizing section;
 a combining section which generates a first composite image by combining the accessory image with the base image;
 a second combining section which generates a second composite image by combining the first composite image with the distinguishing image such that the first composite image is positioned near the distinguishing image when the distinguishing image added to the subject is captured by the image section; and
 a display section which displays the second composite image.

10. The terminal device according to claim 9, wherein the generating section generates different types of accessory images according to contents of the distinguishing image.

11. The terminal device according to claim 9, further comprising: a selecting section which selects type of accessory based on a user operation.

12. The terminal device according to claim 9, wherein the generating section generates an accessory image including the distinguishing image.

13. The terminal device according to claim 9, further comprising:
 a registering section which associates the distinguishing image recognized by the recognizing section and the accessory image generated by the generating section and registers the distinguishing image and the accessory image; and
 an acquiring section which acquires the accessory image corresponding to the distinguishing image by searching contents registered by the registering section based on the distinguishing image.

14. The terminal device according to claim 9, wherein the recognizing section recognizes a distinguishing drawing added to the subject in the image captured by the imaging section as the distinguishing image for the base image.

15. The terminal device according to claim 14, wherein the display section displays the second composite image.

16. A management device comprising:
 a receiving section which receives an image from a terminal device;
 a generating section which generates an accessory image based on the image; and
 a generated image transmitting section which transmits the accessory image generated by the generating section to the terminal device, wherein the terminal device comprises a first combining section that generates a first composite image by combining the accessory image with a base image and a second combining section which, when a distinguishing image for a subject is captured, generates a second composite image by combining the first composite image with the distinguishing image such that the first composite image is positioned near the distinguishing image.

17. A non-transitory computer-readable storage medium having stored thereon a program that is executable by a computer, the program being executable by the computer to perform functions comprising:
 processing for recognizing, as a distinguishing image for a base image, a subject in an image captured by an imaging section of a terminal device that combines the base image with an accessory image and displays a composite image;
 processing for generating the accessory image based on the recognized distinguishing image;
 processing for generating a first composite image by combining the accessory image with the base image; and
 processing for generating a second composite image by combining the first composite image with the distinguishing image such that the first composite image is positioned near the distinguishing image.

18. A non-transitory computer-readable storage medium having stored thereon a program that is executable by a computer, the program being executable by the computer to perform functions comprising:
 processing for combining a base image with an accessory image and displaying a composite image;
 processing for recognizing a subject in an image captured by an imaging section, as a distinguishing image for the base image; and
 processing for generating the accessory image based on the recognized distinguishing image;
 processing for generating a first composite image by combining the accessory image with the base image; and
 processing for generating a second composite image by combining the first composite image with the distinguishing image such that the first composite image is positioned near the distinguishing image.

\* \* \* \* \*